No. 793,104. PATENTED JUNE 27, 1905.
L. L. SMITH.
VAPOR BURNER AND HEATER.
APPLICATION FILED JUNE 17, 1903.

WITNESSES:
C. H. Bertholf
Ida Van Wye

INVENTOR
Louis Lum Smith.
BY
Garry P. Van Wye
ATTORNEY

No. 793,104.

Patented June 27, 1905.

UNITED STATES PATENT OFFICE.

LOUIS LUM SMITH, OF NEW YORK, N. Y.

VAPOR-BURNER AND HEATER.

SPECIFICATION forming part of Letters Patent No. 793,104, dated June 27, 1905.

Application filed June 17, 1903. Serial No. 161,912.

*To all whom it may concern:*

Be it known that I, LOUIS LUM SMITH, a citizen of the United States, residing at New York, in the county and State of New York, have invented a new and useful Vapor-Burner and Heater, of which the following is a specification.

This invention relates to gas generators and burners; and the object thereof is to provide a generator which will produce an inflammable gas from oil and water, a further object being to burn the gas generated within the generator and utilize the heat thereof or a portion of it to generate the gas, a further object being to utilize a portion of the heat for purposes of general utility, a still further object being to provide effective means to introduce the oil and water into the generator, and another object being to provide means to introduce air or other matter into the generator with the oil and water.

My invention is illustrated in the accompanying drawings, in which—

Figure 1:
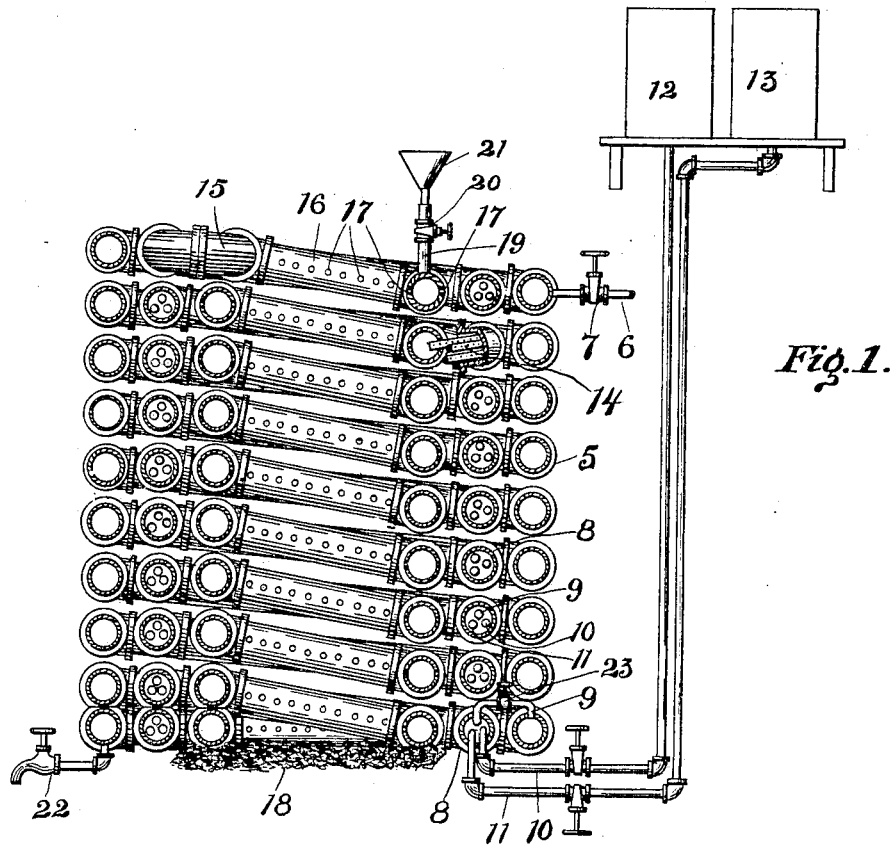
Figure 2:
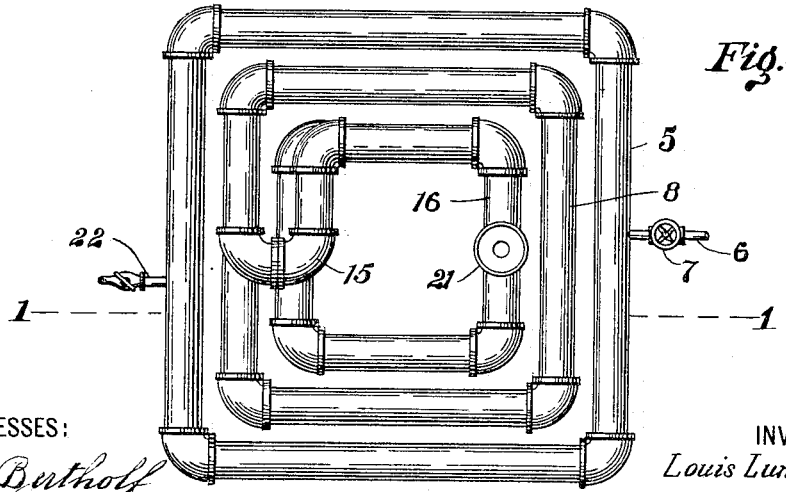

Figure 1 is a vertical section of my improved apparatus on the line 1 1 of Fig. 2, and Fig. 2 is a top plan view thereof.

In the accompanying drawings like numerals of reference refer to the same parts in each of the views, and in practice I provide a coil of pipes 5, preferably rectangular in form and which are preferably connected at the top with a water-main 6, the supply of water being controlled by a valve 7. Within the coil of pipe 5 is a second coil 8, into which there leads a small pipe 9 from the bottom of the coil 5 and two other small pipes 10 and 11, which connect, respectively, with tanks or reservoirs 12 and 13, one of which may contain oil and the other may contain compressed air, or the reservoirs may be omitted and other sources of supply may be provided for the small pipes 10 and 11 upward through the coil 8 to the top thereof, and the pipes 9, 10, and 11 are perforated in the three upper coils of the coil 8, as shown at 14 in Fig. 1. Connected with the coil 8 at the upper end by a connection 15 is a third coil 16, having a plurality of perforations 17 on the inner and outer side of each pipe or turn of said coil, and at the bottom of the coil 16 is an asbestos or other fibrous strip 18, and at the top of this coil there is a small pipe 19, connected therewith and carrying a valve 20, and there may be a funnel 21 mounted in the open end of this short pipe. At the bottom of the coil 9 there is preferably a faucet 22.

The operation is as follows: Water is admitted to the coil 5 through the main 6 or in any manner desired. It fills said coil completely, passing down therethrough. When the valve 23 in said pipe 9 is opened, the water will pass upward through the pipe 9 to the top of the coil 8, and at the same time oil is admitted through one of the other pipes and passes up simultaneous with the water. At the commencement of operations I pour a small quantity of oil into the coil 16 through the funnel 21, and this oil will pass out through the perforations 17 and will drip down over the several turns thereof and will be stopped in its descent by the asbestos strip 18. This oil being lighted will heat up the coil 16 and also the coil 8 and the pipes 9, 10, and 11, contained therein, and as these latter pipes are quite small the oil and water contained therein will be converted into vapor, which can escape through the perforations, as shown at 14, in the three upper coils and will commingle in the three upper turns of the coil 8 and will form a gas as the coil 8 is heated, and this gas will pass through the connection 15 to the coil 16 and will pass down through this coil, escaping through the perforations 17, where it is consumed, and as these perforations 17 are at both sides of this coil part of the flames will be directed against the coil 8, thereby heating this coil to a very high degree and causing the rapid generation of vapor and gas, so that the gas will extend to the bottom of the coil 16 before all of it can escape through the perforations 17, and there will be a continuous flame from the top to the bottom of the coil 16. As the coil 5 incloses the coils 8 and 16 and as the turns of these two coils are not very close together, the heat and flame will pass between the turns of the coil 8 and will heat the coil 5 and the water contained therein. As the pipe 9 communicates with the coil 5 at the bottom, the water will be heated to a high degree before passing into the coil 8, which will aid the conversion of the same into a vapor. At the same time hot water can be drawn from the faucet 22, if desired, for use, as will be readily understood, so that this coil has the double utility of providing hot water for the generator and also of providing hot water for general use. It is also evident that the heat from the burning gas can be controlled and utilized in various ways. Through either the pipe 10 or 11 air may be admitted to the generator to assist in forming the gas, or any other material may be admitted that will add to the efficiency of the generator or the quality of the gas.

It will be understood that while I have described the use of oil as one of the ingredients to form the gas in the generator I do not limit myself to the use of oil, as other material may be introduced instead of oil that will form a gas with the vapor of water, nor do I limit myself to the construction and arrangement of parts here shown, as it is evident that many changes may be made without departing from the spirit of my invention, and I claim the right to make all such changes.

Having thus described my invention, what I claim, and desire to secure by Letters Patent of the United States, is—

1. A vapor burner and generator comprising a coil of pipe, a plurality of small pipes extending therethrough, said small pipes being perforated in the upper part thereof, a second coil mounted within said first coil, and in communication therewith at the top thereof, said second coil being perforated throughout its extent, as and for the purpose set forth.

2. A vapor burner and generator comprising a coil of pipe, a plurality of small pipes connected with a supply of different material respectively extending through said coil from the bottom thereof to the top, said small pipes being perforated in the upper turns, a second coil mounted within said first coil and coextensive therewith, said second coil being perforated throughout its extent, and the perforations being on both the inner and outer sides thereof, and an asbestos strip at the bottom of said inner coil, and means to introduce oil into said inner coil when commencing operation, as and for the purpose set forth.

3. A vapor-burner and heater comprising a coil of pipe, means to admit water, and other matter thereto, a second coil mounted therein and coextensive therewith, said second coil being perforated within and without throughout its extent, and a third coil mounted without said second coil, said third coil being connected with a water-main at the top thereof, and being provided with a faucet at the bottom thereof, said means for admitting water to said first-named coil being connected with said third coil at the bottom thereof whereby the water is taken from said outer coil, as and for the purpose set forth.

In testimony whereof I have signed my name to this specification in the presence of two subscribing witnesses.

LOUIS LUM SMITH.

Witnesses:
 MILLER HAGEMAN, Jr.,
 JACK GMAHLE.